Figure 1:
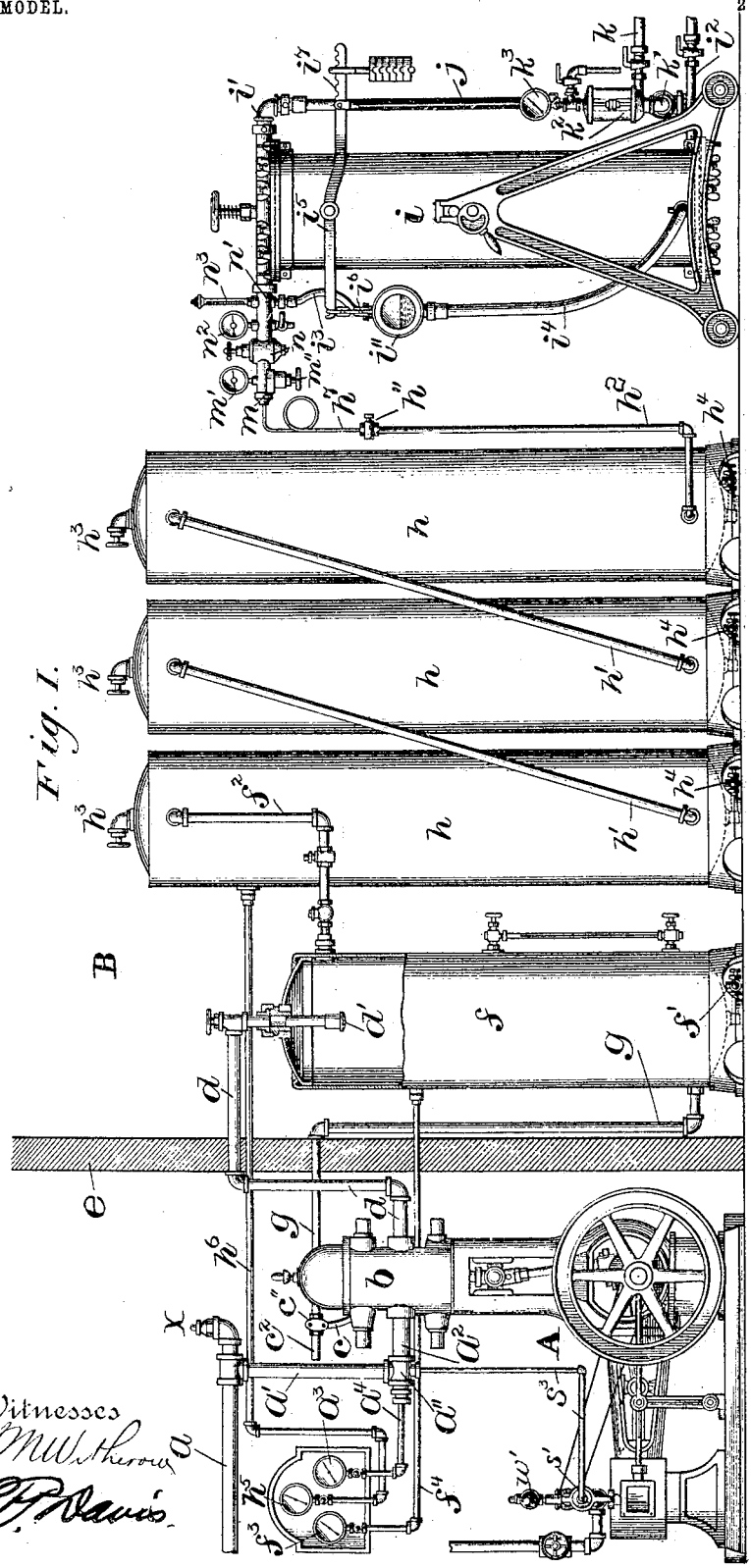

No. 766,481. PATENTED AUG. 2, 1904.
J. F. WITTEMANN.
APPARATUS FOR TREATING FERMENTATION GAS.
APPLICATION FILED DEC. 31, 1898.
NO MODEL. 2 SHEETS—SHEET 1.

Witnesses
Inventor

No. 766,481. PATENTED AUG. 2, 1904.
J. F. WITTEMANN.
APPARATUS FOR TREATING FERMENTATION GAS.
APPLICATION FILED DEC. 31, 1898.
NO MODEL. 2 SHEETS—SHEET 2.
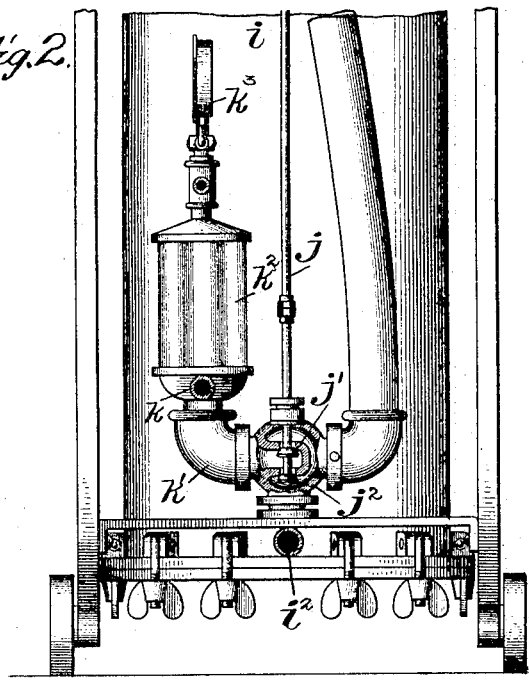
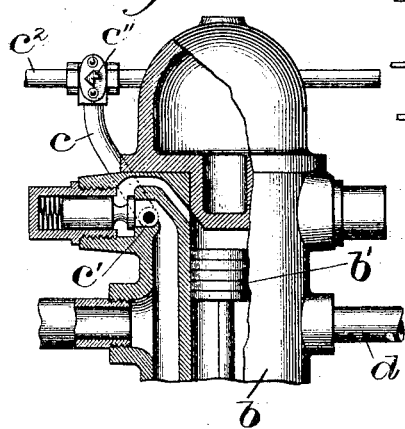
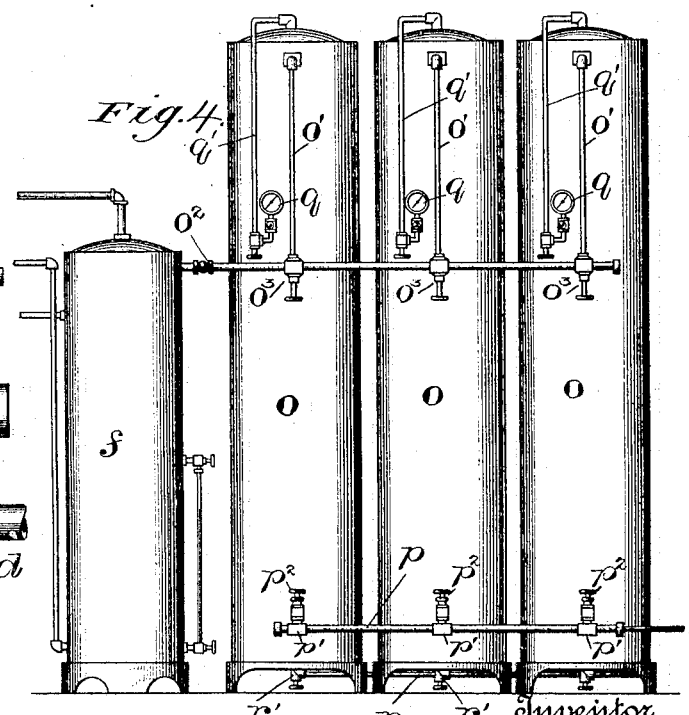

No. 766,481.      Patented August 2, 1904.

UNITED STATES PATENT OFFICE.

JACOB FREDERIC WITTEMANN, OF BROOKLYN, NEW YORK, ASSIGNOR TO THE WITTEMANN COMPANY, OF NEW YORK, N. Y., A CORPORATION OF NEW YORK.

APPARATUS FOR TREATING FERMENTATION-GAS.

SPECIFICATION forming part of Letters Patent No. 766,481, dated August 2, 1904.

Application filed December 31, 1898. Serial No. 700,808. (No model.)

*To all whom it may concern:*

Be it known that I, JACOB FREDERIC WITTEMANN, a citizen of the United States, residing at Brooklyn, in the county of Kings and State of New York, have invented certain new and useful Improvements in Apparatus for Treating Fermentation-Gas; and I do hereby declare the following to be a full, clear, and exact description of the invention, such as will enable others skilled in the art to which it appertains to make and use the same.

This invention relates to apparatus for treating fermentation-gas to prepare it for the purpose of enlivening, vivifying, etherizing, and flavoring fermented beverages or liquids after their fermentation has subsided and they have become quiet or flat and have settled to brightness by resaturating the same with the most desirable part of the gas recovered from fermentation, together with others carried over with such gas, the same being the product of their own fermentation or of that of a similar beverage.

While various apparatus have previously been employed to reënliven beverages, as by the addition of pure carbonic-acid gas or by resaturation with gas taken either from the same beverage during its fermentation or from similar fermenting liquids, it is found that such reënlivened beverages lack the natural agreeable tonic flavor and taste possessed by beverages which have been allowed to undergo a secondary fermentation under pressure either through the addition of yeast or sometimes of so-called "yeast-food" in the shape of sugar or by the addition of a certain percentage of the same or a similar beverage in active fermentation. In either case the containing vessels of such beverages have to be of sufficient strength and tightness to hold without appreciable loss the gas-pressure generated through this after-fermentation or so much of it as it is desirable to retain.

In carrying out my invention I rack off a sufficient quantity of the beverage under treatment when the same is in active fermentation in an ordinary fermenting-vat and has raised a solid head in the first stage of the fermentation, when it may be skimmed, agitated, or re-aerated, as the case may be, and such quantity of the fermenting beverage is conducted into a closed cask or casks kept tight enough for a pressure of about ten pounds above that of the atmosphere, such vessel being filled within a short distance of its top. The fermentation of the beverage being in active progress, the remaining space in said vessel soon fills with the gases of fermentation, which displace any air contained in the same, the air escaping through a suitable vent. The absence of air from the escaping gases can readily be detected by the odor, and the vent is then closed and a connection made to a gas-conduit leading to a gas-compressor, this conduit having been previously freed of air either by a liquid or gas entering from the bottom upward.

The compressor may be of any ordinary construction, but with sufficient clearance in its valves to allow for the carrying along with the gas to be compressed a sufficient quantity of cooling liquid to absorb the heat generated by the compression of the gas. Now the fermentation-gas is usually saturated with aromatic ethers, (usually about one-half per cent.) and such ethers either diffuse or change their nature under the heat generated by compression, whereby a peculiar (mostly repulsive) flavor is imparted to beverages charged with fermentation-gas. Cooling on the outside of a compression-cylinder having proven insufficient to obviate this I, propose to feed a variable proportion of refrigerated water with the gas at each stroke of the compressor, and as this water must be free of air and has to feed into the compressor-cylinder against the pressure of the gas-supply I preferably carry it back from the discharge-receiver to the compressor, means being provided for refrigerating the said receiver, as by placing it within a refrigerated room, providing a refrigerating-coil within the receiver, or otherwise subjecting it to the action of a refrigerating medium. As the compressor discharges into said receiver pressure is gradually raised in the same and the accumulated cooling liquid forced back into the feed side of the compressor under the full pressure developed within said receiver, communication being provided between such receiver and one or a series of storage-tanks to receive the gas after it has separated from the cooling liquid. This receiver constitutes a purifier or gas-washer by reason of the combined compressed gas and cooling-water being discharged through the body of the receiver in subdivided form, the cooling-water passing through the body of gas accumulated within the reservoir in a fine shower at each stroke or delivery of the compressor, absorbing volatile acid-vapor, which usually is in mixture with fermentation-gas as it arises fresh from a fermenting beverage. As the cooling-water thus used as a purifying medium accumulates in the bottom of the receiver it is recooled and gradually returned to the inside of the compressing-cylinder and used over again. After the cooling liquid becomes saturated with acid or other organic gases and becomes non-absorbent it is discharged through a drain provided at the bottom of the receiver and is replaced by a fresh supply of purifying liquid. I preferably employ plain pure water as the cooling and washing medium; but any other liquid or solution may be used if it is desired to absorb any other component part of fermentation-gas than the free acid. If the fermentation-gas is intended for liquefaction, a strong oxidizing solution may be employed, such as a solution of permanganate of potash, for the purpose of absorbing not only acid-vapors, but also the flavoring-ethers contained in the gas.

My experiments have shown that fermentation-gas in which the fermentation-ethers have remained in undisturbed condition cannot conveniently be cooled to the necessary low temperature to make it fit for absorption by liquids except when kept for a sufficient length of time (usually about one day) in one or more tight containers of not too large a size to allow the proper radiation of heat contained within the gas.

The present invention, therefore, further provides for speedily and conveniently effecting the necessary refrigeration of the fermentation-gas so as to make it serviceable for the resaturation of liquids, especially such as beer, wine, and similar beverages, by arranging a series of suitable containing vessels exposed to a refrigerating medium, as by erecting them in a cold compartment.

In practical use the gas which has been cooled to the proper temperature in a containing vessel can be withdrawn, preferably from the bottom of the latter, and the pressure within said vessel allowed to gradually diminish, or else a fresh supply of gas may be supplied into its top, so as to gradually displace the cooler gas, which discharges from the bottom outlet. I preferably provide communicating pipes connecting a series of such gas-storage tanks at both the top and bottom, each connection between such communicating pipes and the tanks being equipped with a suitable valve or stop, so that the inlet or outlet of each tank may at any time be put into communication with the respective inlet or discharge pipe or shut off from the same; but I may also make a continuous connection between such tanks, connecting the bottom outlet of one with the top inlet of the next communicating tank, thus forming, in effect, one continuous container and providing for gradual displacement of the cooler gas contained therein by the fresh supply of warmer gas. Each tank is provided at the top with a vent and at the bottom with a drain for the purpose of drawing off any condensation from the same. In order to completely displace the air from such tanks before they are filled with the gas, I first fill them completely with practically air-free water and then displace this water by the gas entering at the top, discharging the water through the bottom drains. In saturating liquids with fermentation-gas thus prepared I provide a connection between the storage tank or tanks and a separate apparatus or carbonater, causing the gas before entering the carbonater to first pass through a pressure-reducing valve, next through a moisture-absorbing device, preferably consisting of a series of layers of felt or cotton fiber, and finally past a thermometer, these devices being mounted directly on the carbonator or at any other convenient place. They may, however, be dispensed with, except the pressure-reducing valve, which serves to maintain within said saturater or carbonater a supply of gas at a predetermined regular pressure. The beverage to be saturated is supplied under a pressure exceeding that at which the gas-pressure is maintained, preferably by about three to five pounds, and in entering it first passes a supply-regulating valve, which is controlled by a rod communicating with the balanced support of an overflow-tank, the latter being in communication with both the top and bottom of the saturating apparatus, so that the liquid-level within the carbonater is indicated by said overflow-tank and the liquid-supply controlled thereby.

The overflow-tank is preferably made of a horizontal pattern, so as to cause a slight variation in the liquid-level to have an action on the liquid-supply valve.

The drawings which accompany and form part of this specification illustrate my improved apparatus above explained, and pointed out in the appended claims.

Figure I represents chiefly in side elevation an apparatus for carrying out the invention, certain parts being shown broken away and in section. Fig. II shows the lower portion of the saturator or carbonater looking from the right of Fig. I with some parts broken away and in section. Fig. III is a sectionalized side elevation of a portion of the compressor-cylinder and some adjacent parts, showing the connection for the cooling liquid. Fig. IV shows the receiver in front elevation, together with a series of gas-containers or storage-tanks somewhat differently arranged than those appearing in Fig. I.

The letter $a$ designates a pipe which leads from one or more fermentation-casks in which active fermentation is in progress, said pipe being shown as extending horizontally and connected by a suitable union with a safety-valve $x$ and with a vertical pipe-section $a'$, which is in turn connected by a union $a''$ with a short horizontal section $a^2$ entering the side of the compressor-cylinder $b$. The compressor A is of the well-known double-acting type, so that at each stroke of its piston $b'$ a charge of gas will be drawn into the cylinder from the fermentation-casks, while another charge previously taken in on the opposite side of the piston is being compressed and discharged. In furtherance of the chief object of my invention a pipe $c$ is arranged to communicate at the point $c'$ (see Fig. III) with the compressor-cylinder, this pipe being shown as a branch of a pipe $c^2$, which communicates with a supply of refrigerated liquid, so that with each stroke of the piston $b'$ a charge of this refrigerated liquid may be drawn in with the gas. The mixture of gas and liquid is discharged from the compressor-cylinder through a pipe $d$, which extends through a vertical wall $e$, dividing the compartment in which the compressor is located from a compartment B, which is maintained at a very low temperature by any suitable means. Within this cold compartment a tank $f$ rests upon the floor near the partition $e$ and constitutes a receiver for the mixture of gas and liquid, the pipe $d$ entering the top of said tank and communicating with a nozzle $d'$, which is slitted or perforated so as to subdivide the commingled gas and liquid, whereby a washing effect is had as the liquid discharges in a shower of fine spray through the body of gas within the receiver. The liquid collects in the bottom of the receiver, and I preferably extend a pipe $g$ from the lower portion of the receiver to the cold-liquid-supply pipe $c^2$ and arrange a valve $c''$ in the union-coupling which connects the pipes $g$, $c^2$, and $c$, so as to provide for circulating the supply of cooling liquid until it becomes non-absorbent. As hereinbefore stated, the object of this circulating system is to provide for conveniently maintaining the liquid at a low temperature, this being effected by its collection in the bottom of the receiver, which is located in the cold room, and also to keep it under a sufficient pressure to insure its being drawn into the compressor-cylinder with the gas, which is of course under pressure as it comes from the fermentation-vats. It will be understood that the accumulation of gas in the receiver will eventually exert a pressure on the liquid collected in the bottom of the receiver sufficient for this purpose.

As hereinbefore stated, the receiver $f$ also constitutes a gas washer or purifier by reason of the mixture of gas and liquid being discharged therein in subdivided form, the liquid in passing through the body of gas in the form of fine spray being adapted to absorb the volatile-acid vapor usually in mixture with fermentation-gas which arises fresh from any fermenting beverage. When the charge of liquid becomes non-absorbent, it is drawn off by means of a drain-cock $f'$ at the bottom of the receiver and a fresh charge of refrigerated liquid is admitted through the pipe $c^2$.

In the apparatus shown in Fig. 1 a series of storage-tanks $h$ rest side by side upon the floor of the cold-room B, the bottom of the first tank being connected with the top of the second tank and the bottom of the latter with the top of the third tank by pipes $h'$, so that these tanks form, in effect, one container. The first tank of the series is connected with the top of the receiver $f$ by a pipe $f^2$, which enters the top portion of said storage-tank, and the bottom portion of the last tank of the series has an outlet-pipe $h^2$ fitted to its lower portion and designed to convey the gas to a saturating apparatus. Each of the tanks $h$ has an air-vent $h^3$ at the top and a drain-cock $h^4$ at the bottom. Gas-pressure in the tanks can be read by a gage $h^5$, which is connected by a pipe $h^6$ with the first tank of the series, said gage being mounted in a panel also containing gages $a^3$ and $f^3$, connected by pipes $a^4$ and $f^4$ with the union $a''$ and the receiver $f$, respectively.

The saturating apparatus or carbonater here shown is of a well-known type and comprises a tank $i$, into the top of which a pipe $i'$ enters to supply the flat beer or other beverage to be recharged and out of the bottom of which leads a pipe $i^2$ for drawing off the charged liquid. A constant head of liquid is maintained within the tank $i$ in a well-known manner by means of a horizontally-disposed floating cylinder $i''$, communicating with both the top and bottom of the tank by pipes $i^3$ and $i^4$ and suspended from one end of a lever $i^5$ by a chain $i^6$, the opposite end of the lever being formed for adjustment thereon of a counterbalancing-weight $i^7$ and being connected by a rod $j$ with a valve $j'$ in a casing $j^2$, with which the pipe $i'$ communicates. A flat-beer-supply pipe $k$ also communicates with this casing through an elbow $k'$, upon which is mounted a sight-glass $k^2$ and a pressure-indicator $k^3$.

The gas-pipe $h^2$ joins the casing of an expansion-cock $h''$, from which a smaller pipe $h^7$ leads to a casing $m$, having a gage $m'$ mounted thereon and a pressure-reducing valve $m''$ contained therein. This casing is in communication with a filter $n$, and a pipe-section $n'$ leads from the latter into the top of the carbonater-tank $i$, a gage $n^2$ being mounted upon said pipe-section and also a thermometer $n^3$. By means of the gages above mentioned the gas-pressure can be accurately determined, and with the thermometer in communication with the gas-conduit the temperature of the gas entering the carbonater is predetermined. The mixture of this gas with the flat beer, or, in other words, the saturation of the latter with gas, takes place in a well-known way, the beverage being supplied under a pressure somewhat exceeding that at which the gas is maintained and said beverage being discharged into the carbonater-tank in subdivided form.

In Fig. IV the storage apparatus is shown somewhat differently arranged than in Fig. I. Three tanks $o$ stand side by side in the cold-room, as in the previously-described arrangement, not, however, being connected in series, but having their top portions connected by vertically-extending pipes $o'$ with a horizontally-extending pipe $o^2$, leading from the top of the receiver $f$, the unions connecting the pipes $o'$ and the pipe $o^2$ being provided with valves $o^3$, so that the tanks may be independently charged with gas. The arrangement for discharging gas from the tanks is of a similar nature, comprising a pipe $p$, extending horizontally along the three tanks and having branches entering the lower portions of the tanks and connected with said pipe $p$ by unions $p'$, containing valves $p^2$. In this last-described storage arrangement there is a gage $q$ for each tank, such gage being located in front of the tank and connected with the top thereof by a pipe $q'$. A common drain-pipe $r$ extends along underneath the tanks connecting with the interiors of the latter by means of valved unions $r'$.

The manner in which my present invention is carried out by the form of apparatus above described with reference to the drawings will be understood from the statement of invention preceding the description, so that no further explanation is considered necessary.

It will of course be understood that I am not limited to the particular form and arrangement of the said apparatus and that other forms or embodiments can be employed and still be within the scope of invention intended to be embraced herein.

I lay no claim herein to the process disclosed by the above description and the accompanying drawings, since such process forms the subject-matter of a separate application, filed March 16, 1900, Serial No. 8,991, and which application is a division of the present case.

Having thus fully described my invention, what I claim as new, and desire to secure by Letters Patent of the United States, is—

1. In an apparatus of the character described, a conduit for fermentation-gas leading from one or more closed fermenting vessels containing a refrigerated liquid under pressure of gas generated by fermentation, a supply-pipe carrying a refrigerated fluid, means for refrigerating said fluid, and a combined liquid and gas compressor having suitable connection on the supply side thereof with said conduit, a valved connection leading from said pipe to the supply side of said compressor, a receiver, a pipe connecting the latter with the delivery side of the compressor, and said receiver having communication with said supply-pipe for returning the cold fluid to the compressor under pressure of the gas in said receiver, substantially as described.

2. In an apparatus of the character described, a conduit for fermentation-gas leading from one or more closed fermenting vessels, a fluid-supply pipe carrying refrigerated fluid, means for refrigerating said fluid a compressor having suitable connection on the supply side thereof with said conduit, a valved connection leading from said pipe also to the supply side of said compressor, a receiver, a pipe connecting the latter with the delivery side of the compressor, means for discharging the cold fluid from the receiver at will, and means for returning the fluid to the compressor under pressure of the gas in said receiver, substantially as described.

3. In an apparatus of the character described, a conduit for fermentation-gas leading from one or more closed fermenting vessels, a fluid-supply pipe carrying refrigerated fluid, means for refrigerating said fluid, a compressor having suitable connection on the supply side thereof with said conduit, a valved connection leading from said pipe also to the supply side of said compressor, a receiver, a valved pipe connecting the latter with the delivery side of the compressor, and provided with a spray-nozzle on the inner side of said receiver, and means for returning the fluid to the compressor under pressure of the gas in the receiver, substantially as described.

4. In an apparatus of the character described, a conduit for fermentation-gas leading from one or more closed fermenting vessels, a fluid-supply pipe carrying refrigerated fluid, means for refrigerating said fluid, a compressor having suitable connection on the supply side thereof with said conduit, a valved connection leading from said pipe also to the supply side of said compressor, a receiver, a valved pipe connecting the latter with the delivery side of the compressor, and provided with a spray-nozzle on the inner side of said receiver, means for discharging the cold fluid from the receiver at will, and means for returning the fluid to the compressor under pressure of the gas in said receiver, substantially as described.

5. In an apparatus of the character described, a conduit for fermentation-gas leading from one or more closed fermenting vessels, a fluid-supply pipe carrying refrigerated fluid, means for refrigerating said fluid, a compressor having suitable connection on the supply side thereof with said conduit, a valved connection leading from said pipe also to the supply side of said compressor, a receiver, a pipe connecting the latter with the delivery side of the compressor, and a cold-fluid-return pipe leading from the lower part of the receiver to said valved connection, substantially as described.

6. In an apparatus of the character described, a conduit for fermentation-gas leading from one or more closed fermenting vessels, a fluid-supply pipe carrying refrigerated fluid, means for refrigerating said fluid, a compressor having suitable connection on the supply side thereof with said conduit, a valved connection leading from said pipe also to the supply side of said compressor, a receiver, a valved pipe connecting the latter with the delivery side of the compressor, and provided with a spray-nozzle on the inner side of said receiver, and a cold-fluid pipe leading from the lower part of the receiver to said valved connection, substantially as described.

7. In an apparatus of the character described, a conduit for fermentation-gas leading from one or more closed fermentation vessels, a fluid-supply pipe carrying refrigerated fluid, means for refrigerating said fluid, a compressor having suitable connection on the supply side thereof with said conduit, a valved connection leading from said pipe also to the supply side of said compressor, a receiver, a pipe connecting the latter with the delivery side of the compressor, means for returning the cold fluid to the compressor under pressure of the gas in the receiver, and one or more gas-storage tanks in communication with said receiver, substantially as described.

8. In an apparatus of the character described, the combination of a conduit leading from one or more fermenting-vats, a compressor in the form of a pump having a suitably-valved connection on the supply side with said conduit, a receiver, a suitably-valved conduit leading from the pump in the delivery side thereof and entering said receiver, piping connecting the receiver with the fermentation-gas conduit on the supply side of the pump and having provision for admitting a charge of cold fluid for circulation between the pump and receiver, and a cold compartment inclosing the receiver, substantially as and for the purpose described.

9. In an apparatus of the character described, the combination of a conduit leading from one or more fermenting-vats, a compressor in the form of a pump having a suitably-valved connection on the supply side with said conduit, a receiver, a suitably-valved conduit leading from the pump on the delivery side thereof and entering said receiver, piping connecting the receiver with the fermentation-gas conduit on the supply side of the pump and having provision for admitting a charge of cold fluid for circulation between the pump and receiver, one or more gas-storage tanks in communication with the receiver, and a cold compartment inclosing the receiver and said storage-tanks.

In testimony whereof I affix my signature in presence of two witnesses.

JACOB FREDERIC WITTEMANN.

Witnesses:
CHAS. SPINDLER,
JOSEPH H. STADELMAN.